INVENTOR
EDWARD F. MAC NICHOL JR.

ATTORNEY

May 7, 1957     E. F. MacNICHOL, JR     2,791,737
CONTROL SYSTEM FOR MAINTAINING SYNCHRONISM BETWEEN
REMOTE ELECTRIC MOTORS

Filed Nov. 29, 1945     4 Sheets-Sheet 3

INVENTOR
EDWARD F. MAC NICHOL JR.

BY

ATTORNEY

United States Patent Office 2,791,737
Patented May 7, 1957

2,791,737

CONTROL SYSTEM FOR MAINTAINING SYNCHRONISM BETWEEN REMOTE ELECTRIC MOTORS

Edward F. MacNichol, Jr., Hamilton, Mass.

Application November 29, 1945, Serial No. 631,745

11 Claims. (Cl. 318—310)

This invention relates in general to electromechanical data transmission systems, and more particularly to the problem of establishing the motional synchronism of movable elements in widely separated equipments.

Generally speaking, a data transmission system generates at a transmitter electrical information instantaneously related to the speed and position of a movable element thereat. At a receiver this electrical information is operative upon a servo mechanism or other suitable electromechanical follow-up system to drive a receiver movable element at a corresponding speed. Absolute synchronism is established when transmitter and receiver movable elements are continuously operative at identical speed and in phase.

There are many equipments which require a synchronizing system for successful operation. As an example thereof, reference is made to copending application Serial No. 629,668, filed November 19, 1945 and entitled "Data Transmission System." The aforementioned application discloses the solution of a synchronizing problem presented by an airborne radar system which for purposes of increased range and early warning utilizes a rotatable search antenna carried in an aircraft and synchronized with indicating equipment either shipborne or land-based. It was pointed out therein that the operation of a conventional plan position indicator, or P. P. I., at a receiving point requires that the indicator deflection coil rotate in synchronism with the search antennna while continuously indicating direction corresponding to antenna radiation direction relative to a fixed bearng. In an airborne early warning system, the instantaneous antenna speed relative to a particular bearing is a function of both the antenna speed relative to the aircraft and the rotation of the aircraft relative to a fixed bearing while in flight. Accordingly, an important feature of the airborne synchronizing system disclosed in the above-named application is the transmission of phase synchronizing information in addition to information concerning the instantaneous angular velocity.

The present application is concerned with the problem of the establishment of synchronism between a rotatable antenna and remote indicator equipment wherein the antenna structure is a rotatable, fixed installation. As an example of this particular radar problem, consider a land-based rotatable search antenna which for purposes of increased range is permanently installed atop a tall tower or mountain and which gathers radar target information for transmission to remote indicating equipment over a radio link. In a permanent antenna installation of this type, the problem of synchronization may be simplified considerably by driving the antenna with a constant speed synchronous motor. The synchronizing information transmitted then need only be indicative of the fixed synchronous antenna speed. Phase synchronism may readily be established manually at the receiver. Thereafter the transmitter and receiver rotatable elements will operate in absolute motional synchronism. In the fixed antenna, radar early warning system described, the establishment of phase synchronism, that is, synchronism of the antenna and indicator relative to a particular bearing is accomplished by the transmission from radar antenna to the indicator of an angle mark of known bearing, visible to the radar indicator operator.

In addition to the generation and transmission of electrical information regarding the instantaneous angular speed of the antenna rotatable shaft and a fixed angular position, the radar transmitter installation must provide the video signals obtained as echoes of pulse radiation during the antenna search. It has been observed that the first few microseconds following the main high energy pulse transmission are usually blocked out insofar as target echoes are concerned due to the pronounced ground return or ground clutter. Accordingly, the present system contemplates and has as an object thereof the combination of the synchronizing and echo signals into a single signal for relay to the receiver. In this method of signaling, the synchronizing information is periodically transmitted immediately following the main high energy radar pulse transmission. The remainder of the time between the intermittent pulse transmissions is utilized for the relaying of target video information.

Another object of the present invention is to provide an extremely accurate and simplified electrical system for the generation and transmission of electrical information related to the speed of a rotatable element.

As will hereinafter be disclosed in greater detail, the present method of transmitting synchronizing information utilizes the periodic radar main transmitter pulse as a reference timing signal in connection with a time modulated synchronizing information pulse which follows shortly after the reference timing pulse and which in turn is followed by the target pulse data. Accordingly, it is a further object of my invention to provide a simplified transmitter circuit for inter-relating the transmission of synchronizing information to the target information.

A still further object of the present invention is to provide a simplified receiver which selectively responds to synchronizing data and generates a signal having a frequency related to the synchronous speed of the antenna driving means.

Still another object of the present invention is to provide a data transmission system for radar synchronizing and target information which is substantially non-responsive to natural and man-made electrical interference.

These and other objects of the present invention will now become apparent from the following detailed specification taken in connection with the accompanying drawings, in which.

Figure 1:
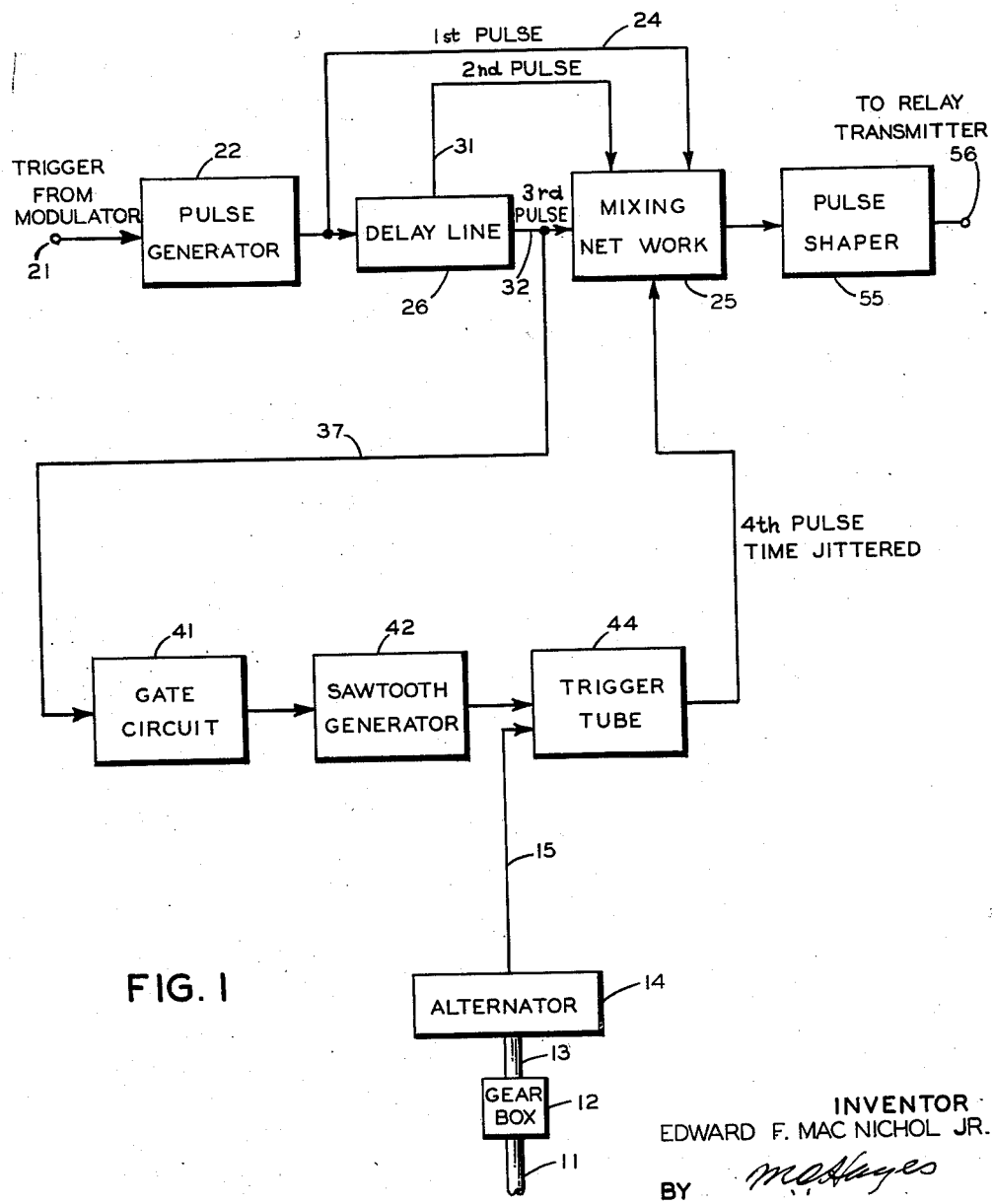
Fig. 1 is a block diagram of the transmitter synchronizing signal networks.

The electromechanical apparatus required at the fixed transmitter installation for the generation of synchronizing information is illustrated in Fig. 1 and reference is now made thereto. A spinning antenna driven by a motor, not hereinillustrated, is coupled by rotatable shaft 11 to a gear box 12 of predetermined step-up ratio. The output shaft 13 of the gear box 12 drives a small alternator 14 at a multiple of the speed of the antenna. The alternator 14 and the gear ratio are selected such that the generated signal appearing at lead 15 at the output of the alternator is in the range of 35–100 cycles, but preferably of the order of 60 cycles when the antenna is driven at the normal speed. The particular frequency used is unimportant, provided that it is less than one fourth of the radar pulse repetition frequency. The alternator output signal frequency is thus instantaneously proportional to the angular speed and the basic synchronizing signal utilized in the presently disclosed system. The method of transforming this basic 60 cycle synchronizing signal into a pulse transmission substantially independent of interference will now be described. The components included in the apparatus are wholly conventional as exemplified by the disclosure in chapter 40 of "Ultra High Frequency Techniques" by Brainerd, Koehler, Reich and Woodruff published by D. Van Nostrand, Inc., July, 1942 and accordingly have been illustrated in block diagram form for purposes of the following description.

Figure 2:
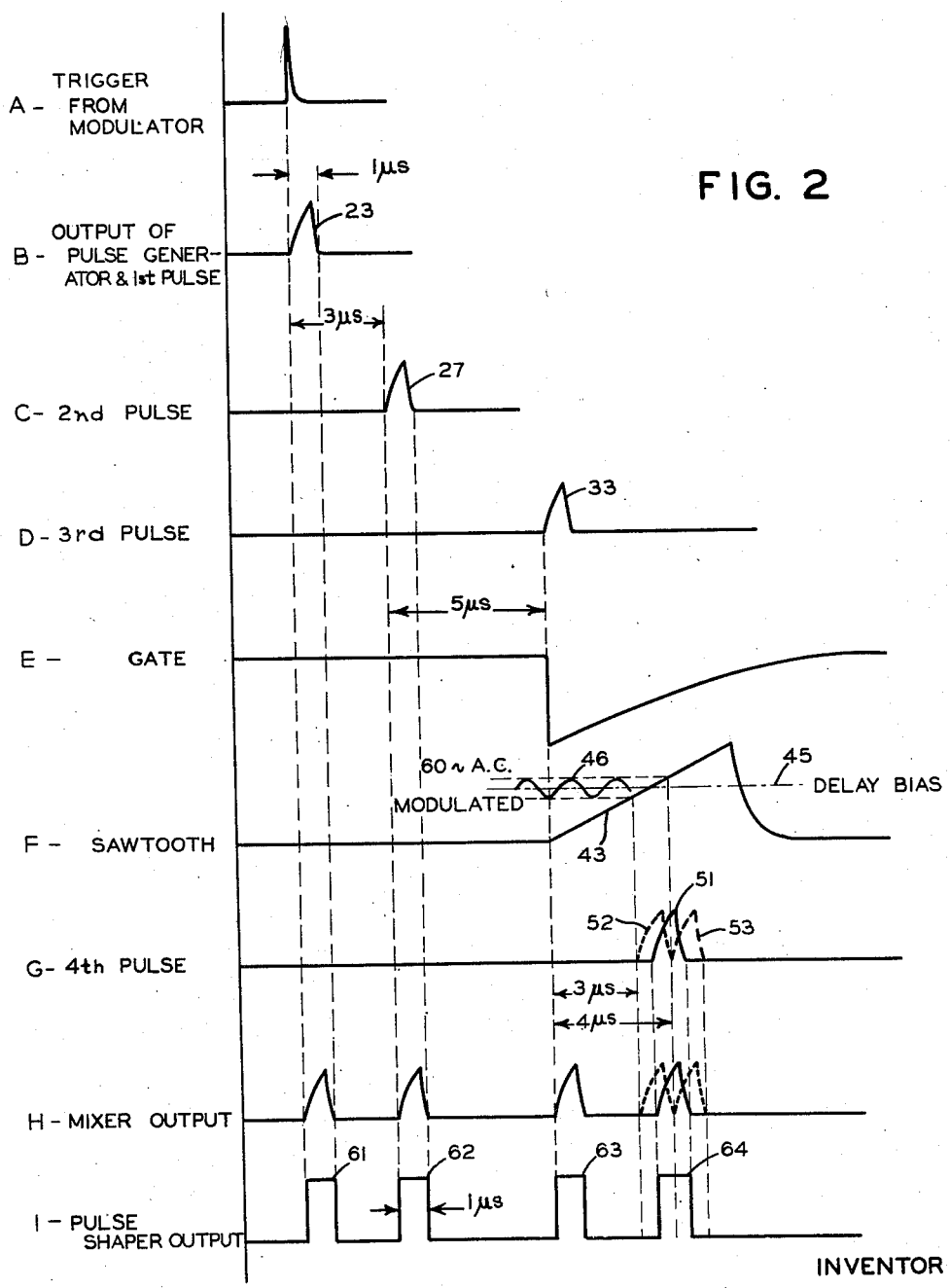
Fig. 2 is a graphical representation of the signal wave forms obtained in the various circuits illustrated in the transmitter, Fig. 1.

The radar transmitter modulator provides a periodic intermittent trigger pulse of extremely short duration as illustrated in the Fig. 2a. This trigger pulse periodically initiates the operation of the high energy pulse transmitter and is in addition applied at terminal 21 of the transmitter synchronizing network illustrated in Fig. 1 to trigger a pulse generator 22. This pulse generator 22 provides an output signal 23 graphically illustrated in Fig. 2b, the leading edge of which corresponds in time with the leading edge of the modulator trigger illustrated in Fig. 2a. The circuit constants of pulse generator 22 determine the time duration of pulse 23 which is preferably of the order of one microsecond. As is illustrated in Fig. 1, the output pulse 23 of the generator 22 is directly applied over lead 24 to an output mixing network 25 to be described in greater detail hereinbelow. In addition, the pulse 23 is applied to a two-section delay line 26. This delay line may take the form of the circuit shown in chapter 2, article 20, of "Principles of Radar," by the Staff of the M. I. T. Radar School, published by the Technology Press, 1944. An output pulse 27, illustrated in Fig. 2c, is taken from an intermediate point on the electrical delay line 26 and is applied by lead 31 to the output mixing network 25. As illustrated in Fig. 2, the intermediate pulse 27 is delayed from pulse 23 by a small amount of time of the order of three microseconds. This delay is prearranged in accordance with an electrical pulse code, which provides an output signal difficult to jam and non-susceptible to ordinary interference. In this particular illustration, the coding is completed by a third pulse which travels through the entire delay line 26 and is applied by lead 32 to the mixing network 25. This third pulse 33 is illustrated in Fig. 2d, and is delayed five microseconds from the second pulse 27.

The fourth pulse generated in the series is made to convey the synchronizing information contained in the basic synchronizing signal appearing at lead 15 at the output of alternator 14. Thus the fourth pulse is initiated by the application of third pulse 33 to lead 37 and to the gate generator 41. As illustrated in Fig. 2e, the leading edge of third pulse 33 initiates a sharp negative voltage gate which appears in the output of gate circuit 41 and is applied in turn to trigger a sawtooth generator 42. In this manner, as illustrated in Fig. 2f, at a time corresponding to the leading edge of third pulse 33 a substantially linear sawtooth wave 43 is generated and as illustrated in Fig. 1 applied to a trigger tube pulse generator 44. An adjustable delay bias represented by the potential level 45, Fig. 2f, is normally applied to the trigger tube such that a pulse is generated when the applied sawtooth wave 43 equals the bias potential 45.

As illustrated in Fig. 1, the alternator output appearing at lead 15 is also applied to the trigger tube 44 so as to modulate the fixed delay bias 45 at the synchronizing signal frequency related to the synchronous speed of the antenna. Accordingly, the delay bias on trigger tube 44 is variable and of a wave form as illustrated at 46, Fig. 2f. Inasmuch as the modulated bias 46 is of a frequency of the order of 60 cycles per second, and the pulse repetition frequency of the radar is of the order of several hundred cycles per second, the reader will appreciate that the wave form illustrated at 46 has been greatly compressed along the time axis and that one cycle of the sixty-cycle A. C. extends over a period during which a number of saw-tooth waves occur. It is evident that the output of the trigger tube pulse generator 44 will comprise a pulse which is modulated or jittered in time with respect to the third pulse 33 in accordance with the low, alternator output frequency.

The trigger tube 44 may, for example, be a triode having the output of saw-tooth generator 42 impressed on its control grid and having a D. C. blocking bias applied to its cathode circuit so that by adjusting the D. C. blocking bias the triode may be held at cut-off until the saw tooth from generator 42 has attained a desired amplitude. In order that the D. C. cathode bias be modulated by the A. C. voltage derived from alternator 14, a coupling transformer may be inserted into the cathode circuit. The output of the triode plate circuit may be coupled to the input of the mixing network 25 through a pulse transformer. The foregoing triode trigger tube is merely exemplary and it is to be understood that other and dissimilar circuits may readily be devised which can perform the functions of trigger tube 44.

The fourth pulse generated by the trigger tube 44 is illustrated by 51, Fig. 2g. The solid line wave form 51 indicates the mid-position, in time, of the fourth pulse inasmuch as the leading edge thereof corresponds with the condition when the sixty-cycle A. C. is passing through zero. The time delay between the fourth pulse 51 and the third pulse 33 is a function of the slope of the sawtooth wave 43 and the applied delay bias 45. These are preferably adjusted to provide a mid-position delay of the order of three and one-half microseconds. The broken line wave forms 52 and 53 shown in Fig. 2g illustrate the maximum deviation from the mid-position in either direction which pulse 51 may assume. The jitter of the pulse 51 is determined by the instantaneous amplitude of the modulating signal 46 applied to the trigger tube generator 44. It is preferred that the maximum time swing in either direction from the mid-position be limited to substantially one-half the time duration of the pulse 51.

The fourth pulse 51 is applied to the mixing network 25 as illustrated in Fig. 1, whose function is to provide the series of successively delayed pulses illustrated in Fig. 2h. The mixing network output is in turn applied to a pulse shaper or blocking oscillator 55 which functions to greatly increase the rate of voltage rise of the leading edge of each pulse such that the output signal appearing at 56 comprises essentially the wave form, Fig. 2i, namely first reference pulse 61, a second pulse 62, third pulse 63, and time jittered pulse 64. The first three pulses thereof, 61, 62 and 63 provide by their spacing and duration a code which is not readily broken or interfered with and in addition provides a timing reference for the jittered pulse 64. The complete signal, Fig. 2i, occurs in a time which is of the order of 13 microseconds and represents substantially the first mile of range following the high energy transmitted pulse initiated by the modulator trigger, Fig. 2a, and provides information as to the time of the initiation of the radar pulse and the speed of rotation of the transmitter antenna. The signal output appearing at terminal 56 is coupled to a relay transmitter not shown herein. At the relay transmitter, the synchronizing signals illustrated in Fig. 2i are periodically transmitted and are followed by the video signals received by the antenna as a result of target echo.

For simplifying the procedure, at the receiver to be described, for separating the synchronizing signals from the video signals, the amplitude of the transmission of the synchronizing signals illustrated in Fig. 2i is increased relative to the target echo signals. As previously mentioned, the synchronizing signals consume a time equivalent to a range of one mile. Inasmuch as this is the first mile of the sweep and is usually completely unimportant insofar as target echo is concerned due to ground clutter, it is convenient to use this time for synchronization. The signals are transmitted to as many receivers as required by the particular radar application.

Figure 3:
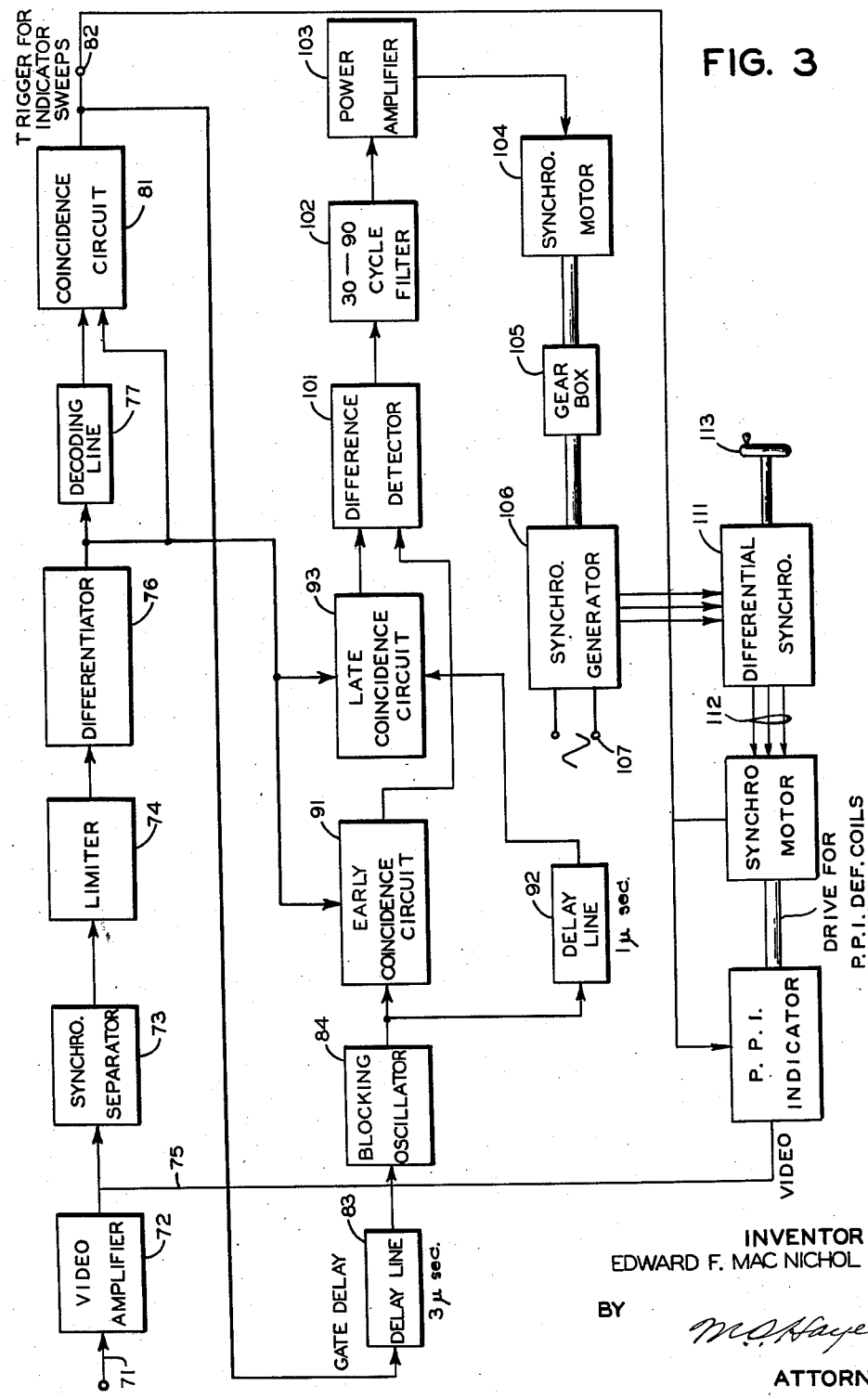
Fig. 3 is a block diagram of the circuit elements required for a receiver synchronizing circuit responsive to the signals generated by the transmitter illustrated in Fig. 1.
Figure 4:
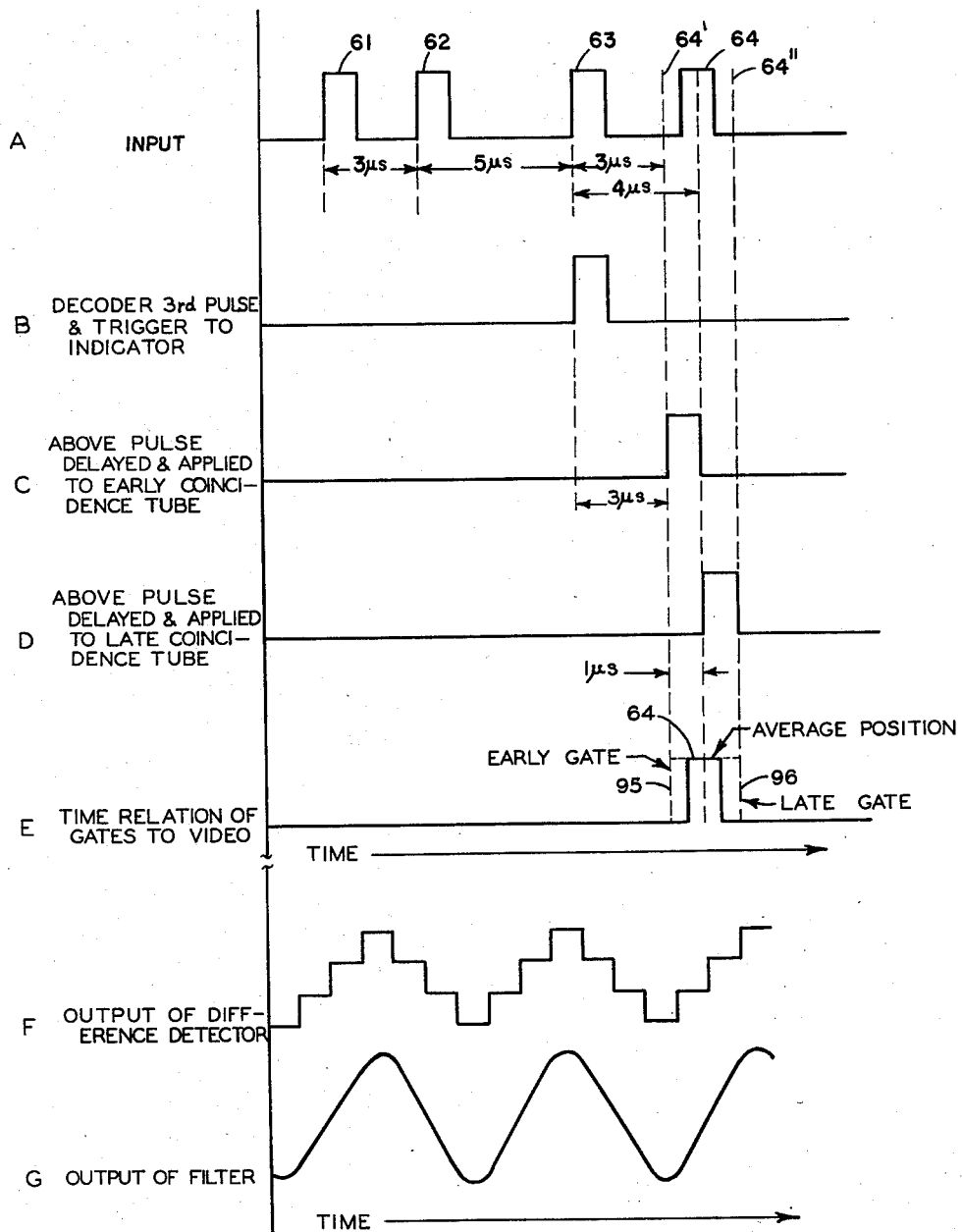
Fig. 4 is a graphical representation of the voltage wave forms appearing in the individual circuits illustrated in Fig. 3.

The indicator receiver circuits will now be described in connection with Figures 3 and 4 and reference is now made thereto. The radio frequency circuits of the receiver are not illustrated in Fig. 3. The signal applied at terminal 71 comprises essentially the de-modulated sequence of timing and synchronizing pulses 61, 62, 63 and 64 as shown in Fig. 4a, followed by the video signals received as a result of target echo. The signals applied at terminal 71 are amplified in a video amplifier 72 and applied to the synchronizing separator circuit 73. The operation of the synchronizing pulse separator circuit 73 is dependent upon the selective amplitude transmission previously described. Thus the separator 73 passes the higher amplitude synchronizing signals to the limiter 74. The video signals are coupled to the indicator circuit, not shown here, by lead 75 which precedes the synchronizing separator 73. The limiter 74 functions to remove any amplitude fluctuations in the synchronizing signal and thereby minimizes the noise content thereof. The limiter output signals are applied to a differentiator circuit 76, which by peaking all applied signals, eliminates any spurious long voltage gates which may have been introduced into the synchronizing signal due to interference. The differentiator circuit 76 precludes the breaking of the code which could otherwise be accomplished by the transmission of an interfering pulse which lasts for the duration of the coded pulse period or longer. For a condition of normal signal input at terminal 71, the differentiator output will comprise essentially a wave form of pulses as illustrated in Fig. 4a. This signal is applied to a conventional decoding line 77, which responds to pulses of prearranged time spacing to provide an output pulse in a coincidence circuit 81 which is coupled at terminal 82 to the indicator circuit, not herein illustrated, for triggering the indicator sweep. Although there is a time delay between the instant of the first pulse 61 and the sweep trigger pulse at terminal 82, there is substantially no error in mileage on a normal long range indicator. If desired, this error may be removed by inserting an equal delay line in the video circuit.

The output signal pulse appearing at terminal 82 is also utilized to trigger the detector circuit to be described. Detector operation has been covered in detail in copending application, Serial No. 630,943, filed November 26, 1945, now Patent No. 2,677,761 entitled "Communication System." The pulse appearing at the output terminal 82 corresponds in time with the third pulse 63 of the coded cyclic transmission. This pulse is applied to a delay line 83, which introduces a time delay substantially equal to the time between the leading edge of the pulse 63 and the leading edge of the jittered pulse 64 when in the minimum time displacement position 64', Fig. 4a. This time delay, for the system described, comprises approximately three microseconds. The delayed pulse appearing at the output of delay line 83 triggers a blocking oscillator 84, which provides an output voltage gate of a time duration substantially equal to the duration of the jittered pulse 64. The time sequence of events is graphically shown in Fig. 4. Thus Fig. 4b illustrates the output decoded pulse appearing at terminal 82 and applied to the delay line 83. Fig. 4c shows the voltage gate generated by the blocking oscillator 84 delayed three microseconds in time from the pulse of Fig. 4b. This pulse is applied directly to an early coincidence tube 91 and indirectly through a delay line 92 to a late coincidence tube 93. The output of the differentiator circuit 76, which includes the time jittered received pulse 64 is applied simultaneously to the two coincidence circuits 91 and 93. The delay line 92 is arranged to provide a time delay of the order of one microsecond such that the late coincidence tube is energized by a one microsecond voltage gate immediately at the termination of the gate applied to the early coincidence tube 91. The relation between the blocking oscillator output gates applied to the coincidence circuits 91 and 93 are illustrated by Figs. 4c and 4d.

The time relation of these coincidence gates relative to the jittered pulse applied to both coincidence circuits 91 and 93 is best shown in Fig. 4e. Thus the average or mid-position of the time jittered pulse 64 effectively "straddles" the double gates 95 and 96 applied to the coincidence tubes. Since pulse 64 is time modulated, it is evident that the extent of conduction of the coincidence tubes 91 and 93 will be governed by the overlap time of the pulse 64 and the applied gates 95 and 96.

A difference detector 101 is employed to integrate the difference between the energy passed by coincidence tubes 91 and 93. The output of the difference detector will therefore fluctuate at a frequency corresponding to the pulse repetition frequency of the radar transmission, and the magnitude of the change thereof will vary in accordance with the jitter frequency of the fourth pulse 64. Accordingly, the wave form will be stepped in time between successive cycles as shown on the compressed time scale in Fig. 4f. A detailed circuit diagram together with a description of the mode of operation of the complete detector, including the cooperating early and late coincidence circuit represented by reference characters 91 and 93 in Fig. 3, is shown also in the copending application of William J. Tull et al., Serial No. 558,576, filed October 13, 1944, now U. S. Patent No. 2,516,356 of July 25, 1950. Since the fundamental frequency of the difference detector signal is substantially 60 cycles when the transmitting antenna is rotated at synchronous speed, a 30 to 90 cycle filter 102 is employed to provide a smooth sine wave output, Fig. 4g for application to a power amplifier 103. The output of power amplifier 103 is utilized to drive a small synchronous motor 104, which is coupled mechanically through a gear box 105 having a step-down ratio equal to the step-up ratio of the corresponding gear box 12 at the transmitter, Fig. 1. The gear box output shaft drives a synchro generator 106 energized at the line terminals 107. The three wire electrical output of the synchro generator 106 is coupled to a differential synchro unit 111, the electrical output of which appearing at terminals 112 is transmitted over a cable to a P. P. I. synchro follow-up mechanism.

It will now be evident that the synchro generator 106 is driven at the speed of the transmitter antenna rotatable shaft 11, Fig. 1. The P. P. I. follow-up mechanism, therefore, drives the P. P. I. deflection coil at precisely this antenna angular speed.

The rotor of the differential synchro unit 111 is coupled to a hand wheel 113, which permits the introduction of additional rotation by manual means. The operator of the receiver is therefore capable of aligning the aforementioned P. P. I. angle mark received from the transmitter with the corresponding true bearing thereof on the face of the reeciver indicator tube and thereby establish phase synchronism. As a result of the inherent stability of synchronous motors and synchro systems, the synchronizing system herein illustrated and described will maintain rotational synchronism for an indefinite period of time following the manual adjustment of the differential synchro 111. The connections of the differential synchro and its associated generator and motor are illustrated in chapter 12, article 11, of the above "Principles of Radar."

Various features of the above described synchronizing system are subject to modification. For example, the basic system described need not be limited to radar relay systems, but may be incorporated in any transmission which permits synchronization by the use of discontinuous synchronizing signals occurring at a substantially regular rate. The system need not be operated with the particular pulse code illustrated nor with the particular pulse jitter demodulating circuit shown in Fig. 3. The time duration of transmission pulses and the repetition rates thereof included herewith are merely illustrative and are subject to modification as required by the particular synchronizing application.

Thus since various extensions of the above described systems may become apparent to those skilled in the art, I prefer that all matter contained in the above description and shown in the accompanying drawings shall be interpreted as illustrative and not in a limiting sense.

What is claimed is:

1. In an electrical transmission system, apparatus for transmitting information indicative of the speed of a rotating element comprising means for generating an alternating signal at a frequency representative of the motion of said rotating element, means for intermittently generating an electrical reference timing pulse means actuated by said reference timing pulse for generating a synchronizing pulse cyclically varying about a point in time occurring a fixed interval after each reference pulse, said synchronizing pulse being displaced from said point in time by an amount proportional to the instantaneous amplitude of said alternating signal and in the direction determined by the polarity of said alternating signal.

2. In an electrical transmission system, apparatus for transmitting information indicative of the speed of a rotating element comprising means for generating an alternating signal at a frequency substantially proportional to the instantaneous speed of said rotatable element, means for generating intermittent and substantially periodic electrical reference timing pulses, means actuated by each of said reference timing pulses to provide a plurality of coding pulses delayed in time from the actuating reference timing pulse in accordance with a predetermined code, means periodically excited by one of said coding pulses to generate a synchronizing pulse cyclically varying about a point in time which occurs a fixed time after each reference pulse, said synchronizing pulse being displaced from said point in time by an amount and in a direction corresponding to the amplitude and polarity of said alternating signal.

3. In an electrical transmission system, apparatus for transmitting information indicative of the speed of a rotating element comprising, for generating an alternating signal at a frequency substantially proportional to the instantaneous speed of said rotatable element, means for periodically generating an electrical reference timing pulse, means actuated by said reference timing pulse to provide a plurality of coding pulses delayed in time from said reference timing pulse in accordance with a predetermined code, means periodically actuated by one of said coding pulses to generate a saw tooth electrical wave of predetermined slope, a pulse generator energized by said saw tooth wave and said alternating signal to provide a synchronizing pulse cyclically varying about a point in time occurring a constant time after said reference timing pulse, the instantaneous position of said synchronizing pulse with respect to said point in time being related to the amplitude and polarity of said alternating signal.

4. In an electrical transmission system, apparatus for establishing rotational synchronism between a rotatable element at a transmitter and a rotatable element at a receiver, comprising means at said receiver for receiving an intermittent, periodic pulse transmission, each period of said transmission including a reference timing pulse and a synchronizing pulse modulated in time relative to said reference timing pulse in accordance with an alternating signal, detector means for demodulating said received time modulated pulse signals to provide a signal corresponding to said alternating signal, means for amplifying said alternating signal, a synchronous motor energized by said amplified signal for driving said receiver rotatable element and operative at the speed of said transmitter rotatable element and means for adjusting the initial position of said receiver rotatable element.

5. In a data transmission system, apparatus for transmitting information representative of the rotational speed of a rotating element comprising, means for generating an alternating signal of frequency proportional to the speed of rotation of said rotating element, means for periodically generating a reference timing pulse, means actuated by said reference pulse for generating a synchronizing pulse delayed in time from said reference pulse and said last-named means including means responsive to said alternating signal for cyclically varying said time delay.

6. In a data transmission system, apparatus for deriving an electrical signal indicative of the rotational speed of a rotating element comprising, a generator rotatable with said element for generating an alternating signal, means for periodically generating a reference timing pulse, means actuated by said reference timing pulse to provide a plurality of coding pulses delayed in time from said reference timing pulse in accordance with a predetermined code, means periodically actuated by one of said coding pulses for generating a synchronizing pulse cyclically varying about a point in time occurring a constant interval after said reference pulse, said synchronizing pulse being displaced from said point in time by an amount proportional to the instantaneous amplitude of said alternating signal and in a direction depending upon the polarity of said alternating signal.

7. In a data transmission system, apparatus for transmitting an electrical signal representative of the rotational speed of a rotating element comprising, means for generating an alternating signal of frequency proportional to the speed of rotation of said rotating element, means for periodically generating a reference timing pulse, means responsive to said reference timing pulse for generating a sawtooth voltage wave delayed in time from said reference timing pulse, and a pulse generator energized by said sawtooth voltage wave and said alternating signal to provide a synchronizing pulse cyclically varying about a point in time occurring a fixed interval following each reference timing pulse, said synchronizing pulse being displaced from said point in time by an amount proportional to the instantaneous amplitude of said alternating signal and in a direction dependent upon the polarity of said alternating signal.

8. In a data transmission system adapted for transmission of information for maintaining rotational synchronism between a rotatable element at a first point and a rotatable element at a second point spaced therefrom, receiver means at said second point for receiving an intermittent, periodic pulse transmission, each period of said transmission including a reference timing pulse and a synchronizing pulse modulated in time relative to said reference timing pulse in accordance with the rotational speed of the rotatable element at said first point, detector means for demodulating said received periodic pulse transmission to provide an alternating signal, and a synchronous motor energized by said signal for driving the rotatable element at said second point and operative at the speed of the rotatable element at said first point.

9. In a data transmission system adapted for transmission of electrical information for maintaining rotational synchronism between a rotatable element at a first point and a rotatable element at a second point spaced therefrom, receiver means at said second point for receiving an intermittent, periodic pulse transmission from said first point, each period of said transmission including a reference timing pulse and a synchronizing pulse modulated in time relative to said timing pulse in accordance with an alternating signal of frequency proportional to the rotational speed of the rotatable element at said first point, detector means for demodulating said received time-modulated pulse signals to provide an alternating signal of frequency equal to the frequency of the aforesaid alternating signal, means for amplifying said alternating signal, and a synchronous motor energized by said amplified signal for driving the rotatable element at said second point.

10. In a data transmission system adapted for transmission of electrical information for maintaining rotational synchronism between a rotatable element at a first point and a rotatable element at a second point spaced therefrom, receiver means at said second point for receiving intermittent and substantially periodic electrical pulse transmissions from said first point, each of said pulse transmissions consisting of a reference timing pulse, a plurality of coding pulses delayed in time from said reference pulse and a synchronizing pulse cyclically delayed in time from said reference timing pulse at a frequency proportional to the rotational speed of the rotatable element at said first point, decoding apparatus for separating said coding pulses from said pulse transmission, detector means for demodulating the synchronizing portion of said pulse transmission to provide an alternating signal of frequency proportional to the rotational speed of the rotatable element at said first point, means for amplifying said alternating signal, and a synchronous motor energized by said amplified signal for driving the rotatable element at said second point.

11. Apparatus in accordance with claim 10 including means at said second point for adjusting the initial position of the rotatable element at said second point.

References Cited in the file of this patent

UNITED STATES PATENTS

| | | |
|---|---|---|
| 2,256,487 | Moseley et al. | Sept. 23, 1941 |
| 2,404,571 | Finch | July 23, 1946 |
| 2,454,792 | Grieg | Nov. 30, 1948 |
| 2,567,862 | Van Voorhis | Sept. 11, 1951 |